US005993722A

United States Patent [19]

Radmacher

[11] Patent Number: 5,993,722

[45] Date of Patent: Nov. 30, 1999

[54] METHOD FOR MAKING CERAMIC HEATER HAVING REDUCED INTERNAL STRESS

[75] Inventor: Stephen J. Radmacher, Toronto, Canada

[73] Assignee: Le-Mark International Ltd., Richmond Hill, Canada

[21] Appl. No.: 08/882,306

[22] Filed: Jun. 25, 1997

[51] Int. Cl.[6] .................................................. C04B 35/622

[52] U.S. Cl. .......................... 264/442; 264/445; 264/651; 264/86; 264/642

[58] Field of Search .................................... 264/442, 445, 264/651, 86, 642

[56] References Cited

U.S. PATENT DOCUMENTS

| | | | |
|---|---|---|---|
| 4,364,783 | 12/1982 | Theodore | 264/445 |
| 4,742,209 | 5/1988 | Minegishi et al. | 219/270 |
| 4,798,694 | 1/1989 | Sugata et al. | 264/651 |
| 5,304,778 | 4/1994 | Dasgupta et al. | 219/270 |
| 5,519,187 | 5/1996 | Hinkle | 219/270 |

FOREIGN PATENT DOCUMENTS

| | | | |
|---|---|---|---|
| 0 180 928 | 5/1986 | European Pat. Off. . | |
| 2323288 | 4/1977 | France . | |
| 403203601 | 9/1991 | Japan | 264/651 |

OTHER PUBLICATIONS

Patent Abstracts of Japan—vol. 016, No. 363 (M–1290), Aug. 5, 1992 & JP 04 113121 A (Mitsui Eng.& Shipbuild Co Ltd), Apr. 14, 1992.

*Primary Examiner*—James Derrington
*Attorney, Agent, or Firm*—L. Anne Kinsman

[57] ABSTRACT

A ceramic heater device for use in a glow plug for a diesel engine has a gradually varying cross-sectional composition which eliminates distinct interfacial junctions between a resistive layer, an insulative layer and a highly conductive layer. The heater is manufactured by slip casting where the proportions of conductive and non-conductive ceramic particles in a slip are varied as the slip is passed through an absorbent mold.

7 Claims, 4 Drawing Sheets

WORKING RANGE OF CONDUCTIVE PARTICLES

SHIELDING VOLUME THICKNESS AS A FUNCTION OF TEMPERATURE

METHOD FOR MAKING CERAMIC HEATER HAVING REDUCED INTERNAL STRESS

FIELD OF THE INVENTION

This invention relates to a ceramic heater device. In particular, this invention relates to a ceramic heater, and method of manufacture therefor, for a glow plug, which eliminates distinct layer interfaces.

BACKGROUND OF THE INVENTION

Conventional ceramic glow plugs have used a multi-layered construction. Such glow plugs are described in U.S. Pat. Nos. 4,742,209, 5,304,778 and 5,519,187. In general, the glow plugs have a ceramic heater with a conductive core enclosed by insulative and resistive ceramic layers, respectively. The layers are separately cast and fitted together. The resulting green body is sintered to form a unitary ceramic heater. During use, these glow plug experience cyclic heating and cooling, which results in high internal stresses at the interfacial junction between the ceramic layers, promoting eventual failure of the glow plugs.

The internal stresses of a layered glow plug are mainly the result of differences in the coefficients of thermal expansion between the differently composed layers. The different layers of the glow plug expand and contract at different rates. Further, residual stresses are the result of manufacture, particularly from uneven contraction in the cooling period which occurs below the plastic deformation state of the ceramic composition, and from non-uniform attachment between the layers.

Oxidation and corrosion of the outer resistive surface in the highly corrosive atmosphere in a diesel engine cylinder is also a problem. The ceramic heater tip becomes caked with a carbon coating during normal use which reduces the lifespan and effectiveness of the glow plug. The presence of carbon residue in the engine cylinder is also highly undesirable and may damage the engine head.

SUMMARY OF THE INVENTION

The disadvantages of the prior art may be overcome by providing a novel ceramic heater for a glow plug wherein the ceramic heater has a graduated composition from a resistive heater to an insulator to a conductor, and by providing a method of manufacturing such a ceramic heater.

It is desirable to provide a ceramic glow plug wherein the ceramic heater tip has a graduated composition from a resistive volume to an insulative volume to a conductive volume.

It is further desirable to provide a ceramic glow plug wherein the resistive volume is shielded.

It is also desirable to provide a method for gradually changing the compositional concentrations across a ceramic heater to reduce internal stresses.

In one aspect of the present invention there is provided a ceramic heater device, comprising a ceramic heater element having a structure graduated from a highly electrically conductive volume to a substantially electrically non-conductive volume to an electrically resistive volume, wherein said highly electrically conductive volume and said electrically resistive volume are electrically connectable to an electrical source for energising said electrically resistive volume.

In a further aspect of the present invention there is provided a method for making a ceramic heater element comprising the steps of:

providing a conductive slip and a resistive slip, each said slips comprising a liquid phase having particles suspended therein, combining said conductive slip and said resistive slip to form a combined slip, passing said combined slip substantially continuously through a slip casting mold while varying proportions of said conductive slip and said resistive slip for forming a green ceramic casting having a graduated structure having a highly electrically conductive volume, a substantially electrically non-conductive volume and an electrically resistive volume, reforming an end of said casting for electrically connecting said highly electrically conductive volume and said electrically resistive volume, separating said casting from said mold, and sintering said casting.

In a further aspect of the present invention there is provided a method for making a ceramic heater element comprising the steps of:

providing a shielding slip, a conductive slip and a resistive slip, each said slips comprising a liquid phase having particles suspended therein, combining said shielding slip, said conductive slip and said resistive slip to form a combined slip, passing said combined slip substantially continuously through a slip casting mold while varying proportions of said shielding slip, said conductive slip and said resistive slip for forming a green ceramic casting having a graduated structure having a shielding volume, a highly electrically conductive volume, a substantially electrically non-conductive volume and an electrically resistive volume, reforming an end of said casting for electrically connecting said highly electrically conductive volume and said electrically resistive volume, separating said casting from said mold, and sintering said casting.

BRIEF DESCRIPTION OF THE DRAWINGS

An embodiment of the present invention will now be described, by way of example only, with reference to the attached Figures, in which.

DETAILED DESCRIPTION OF THE INVENTION

Figure 1:
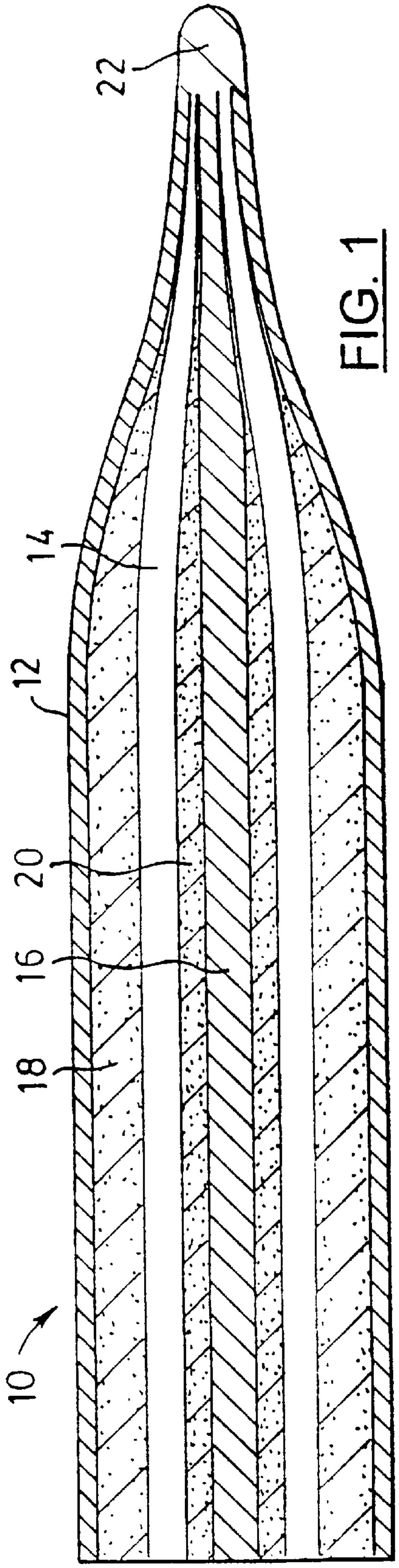
FIG. 1 is a schematic cross sectional view of a ceramic heater device according to a first embodiment of the present invention, sectioned along its longitudinal axis.

A ceramic heater 10 according to a first embodiment of the present invention is shown in cross-section along its longitudinal axis in FIG. 1. As will be clear from the following description, FIG. 1 is an schematic representation which, for purposes of illustration only, depicts ceramic heater 10 as having distinct and separate regions. Ceramic heater 10 has an outer volume 12 which has a highly electrically conductive composition, an intermediate volume 14 which has an insulative, or substantially electrically non-conductive composition, and an inner volume 16 which has a resistive, or moderately electrically conductive composition. Interface zones 18 and 20 lie between outer volume 12 and intermediate volume 14, and intermediate volume 14 and inner volume 16, respectively.

Interface zone 18 has a graduated composition varying inwardly from the highly conductive composition of the outer volume 12 to the insulative composition of the intermediate volume 14. Likewise, interface zone 20 has a graduated composition varying inwardly from the insulative composition of the intermediate volume 14 to the resistive composition of the inner volume 16. At tip 22, the outer volume 12 and inner volume 16 join to form an electrical connection.

In operation, an electrical potential is applied across inner volume 16 and outer volume 12 causing inner volume 16 to produce heat. As is known in the art, ceramic heater 10 has a reduced cross-section in the proximity of the tip 22 to increase the resistance in this region and, hence, the heat produced by the ceramic heater.

The ceramic heater 10 is manufactured by a novel method of modulated slip casting. This method is best illustrated by way of example.

A first electrically conductive mixture is prepared. One or more conductive components is selected from the group comprising $MoSi_2$, TiN, ZrN, TiCN and $TiB_2$ from about 100 to about 40 percent by volume. One or more non-conductive components is selected from the group comprising $Si_3N_4$, silicon carbide, aluminum nitride, alumina, silica and zirconia from about 0 to about 60 percent by volume. A sintering additive from about 6 to about 0 percent by volume may also be included. The sintering additive includes yttrium, magnesia, calcium, hafnia and others of the Lanthanide group of elements.

A second substantially non-conductive mixture is prepared. One or more non-conductive components is selected from the group comprising $Si_3N_4$, silicon carbide, aluminum nitride, alumina, silica and zirconia from between about 100 to about 95 percent by volume. A sintering additive from about 0 to about 5 percent by volume may be included. The sintering additive includes yttrium, magnesia, calcium, hafnia and others of the Lanthanide group of elements.

The respective components of the first and second mixtures are finely ground particles. Optimally, the particles can range in size from about 0.2 to about 0.8 microns. The finely ground mixtures are suspended in a solvent, such as water, as a liquid phase and a suitable deflocculant, such as ammonium polyacrylate, known commercially as DARVAN C™, to produce a first conductive slip and a second non-conductive slip for slip casting.

An absorbent, tubular mold, open at both ends, is provided. The mold can be fabricated from plaster of Paris or any other suitable absorbent material. In a preferred embodiment the mold is provided with a smaller inner diameter step to produce a ceramic heater 10 having a relatively small diameter in the proximity of the tip 22, as is illustrated in FIG. 1.

The first conductive slip and the second non-conductive slip are selectively pumped through a mixing chamber prior to introduction into the mold. The mixing chamber allows the first and second slips to be combined in predetermined proportions, as desired. The resultant combined slip can include any proportion of the first and second slips, and can be solely the first or second slip.

As in conventional slip casting, the combined slip is pumped through the open ended mold. As the combined slip passes through the mold it is slowly de-watered at the mold surface and the ceramic particles in the combined slip suspension are deposited on an interior surface of the mold. Fresh slip is continuously pumped through the mold until the deposited particles fill the mold to form a green ceramic body.

As the ceramic particles are deposited, the proportions of the first and second slips in the combined slip are varied. The resultant green ceramic body has a cross sectional composition varying in relation to the proportions of the first and second slips in the combined slip.

The proportions of the first and second slips are varied in predetermined proportions such that an outer volume substantially consisting of the first mixture is first deposited in the mold. After particles of the first slip have been deposited to a sufficient thickness, ideally ranging from about 5 to about 100 microns, the proportion of the second slip in the combined slip is gradually increased while the proportion of the first slip is gradually decreased to zero. As the combined slip passes through the mold, an interface zone is formed creating a gradual transition from the outer volume to an intermediate volume substantially consisting of particles from the second slip. After particles from the second slip have deposited to a sufficient thickness, ideally ranging from about 5 to about 600 microns, a second interface zone is formed by gradually increasing the proportion of the first slip while decreasing the proportion of the second slip. An inner volume consisting of both the first and second mixtures is then deposited until the mold is full.

To form an integral electrical connection between the outer and inner volumes, a tip of the green body is reformed by applying low intensity vibrations from an ultrasonic wand to the tip before the green body is removed from the mold. The low intensity vibrations cause the particles at the tip to be blended into an electrically conductive tip joining the inner and outer volumes.

Once the liquid phase has been substantially absorbed through the walls of the mold, the green body with a reformed tip is removed from the mold, allowed to air dry and sintered to form a ceramic heater body.

Figure 2:
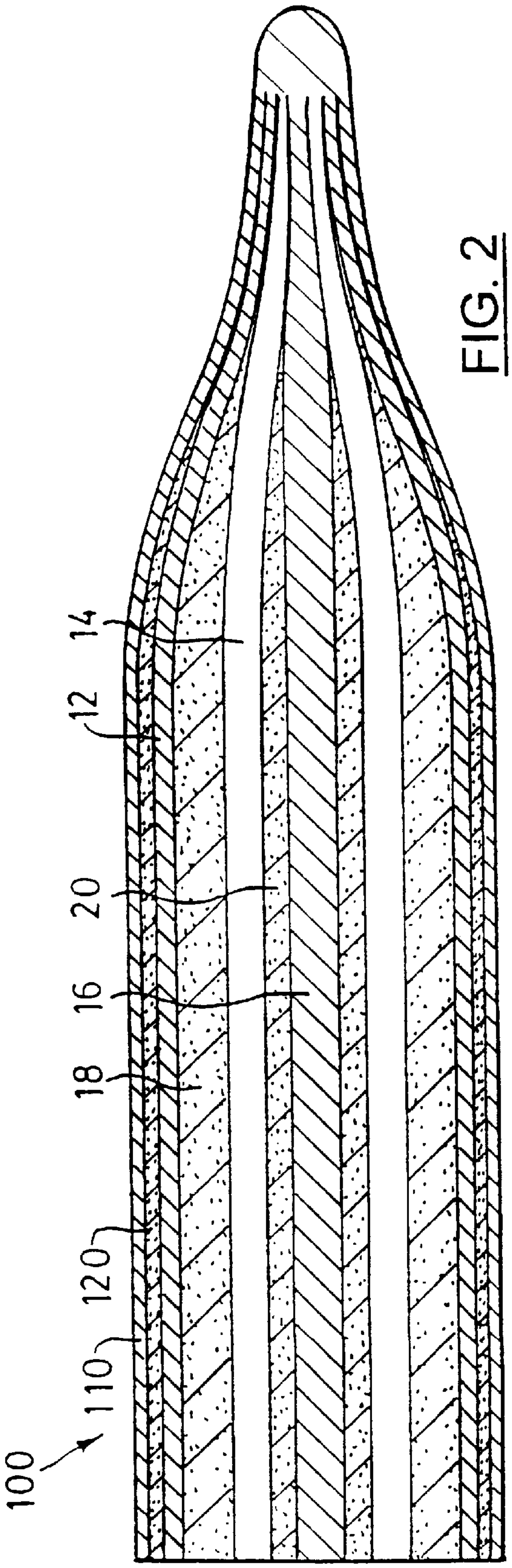
FIG. 2 is a schematic cross sectional view of a ceramic heater device according to a second embodiment of the present invention, sectioned along its longitudinal axis.

A second embodiment of a ceramic heater of the present invention, generally designated as 100, is shown in FIG. 2. FIG. 2 is also a schematic representation which, for purposes of illustration only, depicts ceramic heater 100 as having distinct and separate regions. Similar reference numerals refer to similar structures, and are as described in relation to the ceramic heater of FIG. 1.

Ceramic heater 100 has an outer shielding volume 110. Shielding volume 110 is separated from outer volume 12 by a third interface zone 120. Interface zone has a graduated composition varying inwardly form the shielding composition of shielding volume 110 to the highly conductive composition of outer volume 12.

To form ceramic heater 100, a third slip is used in combination with the first and second slips described above. The third slip contains a higher proportion of elements chemically stable at the elevated temperatures found in a diesel engine. The elements are selected from the components of the first and second slips. For example, the third slip can contain a higher proportion of $MoSi_2$ and a lower concentration of $Si_3N_4$ than the first slip, or, alternatively, a larger proportion of $SiO_2$, depending on the components chosen for the first slip. The third slip will generally be a conductive mixture, but will be more corrosion and heat resistant than the conductive first slip due to the higher concentrations of more stable elements.

In a manner similar to that described above, the first, second and third slips are combined in predetermined proportions before being introduced into a slip casting mold. The proportions are first chosen such that a shielding volume consisting substantially of the particles in the third slip is first deposited in the mold to a sufficient thickness, ideally from about 5 to about 10 microns. The proportions of the slips are then varied to gradually increase the proportion of the first slip, while the proportion of the third slip is gradually decreased to about zero, thus creating an interface zone having a gradual transition from a shielding volume to a highly conductive outer volume. After particles of the first slip have deposited to a sufficient thickness, ideally ranging from about 5 to about 100 microns, the slip proportions are then varied to gradually increase the proportion of the second slip while the proportion of the first slip is gradually decreased to about zero. An interface zone is formed creating a gradual transition from the highly conductive outer volume to an insulative, intermediate volume. After particles forming the intermediate volume have deposited to a sufficient thickness, ideally ranging from about 5 to about 600 microns, a second interface zone is formed by gradually increasing the proportion of the first slip, and, optionally, the third slip, while decreasing the proportion of the second slip thereby creating a gradual transition from the insulative, intermediate volume to a conductive, inner volume.

As in the first embodiment, a tip of the resulting green body is reformed to provide an electrical connection between the inner and outer volumes. The green body is then removed from the mold, air dried and sintered to form a ceramic heater body.

Figure 3:
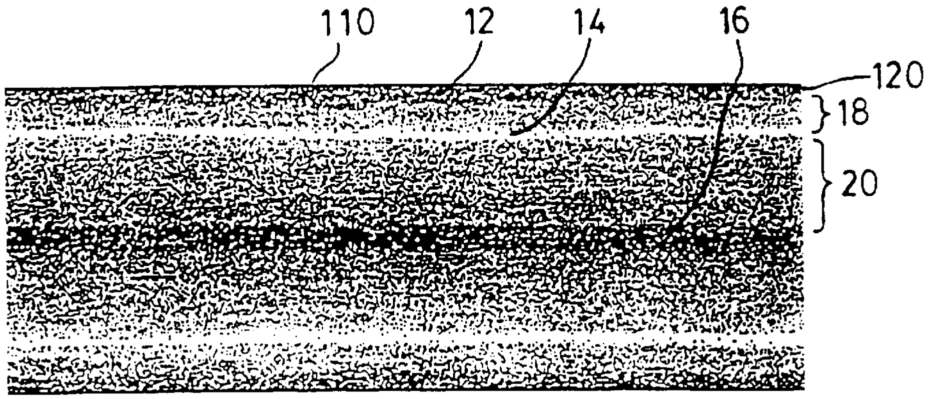
FIG. 3 is a cross sectional view, showing conductive particle distribution, in accordance with FIG. 2.
Figure 4:
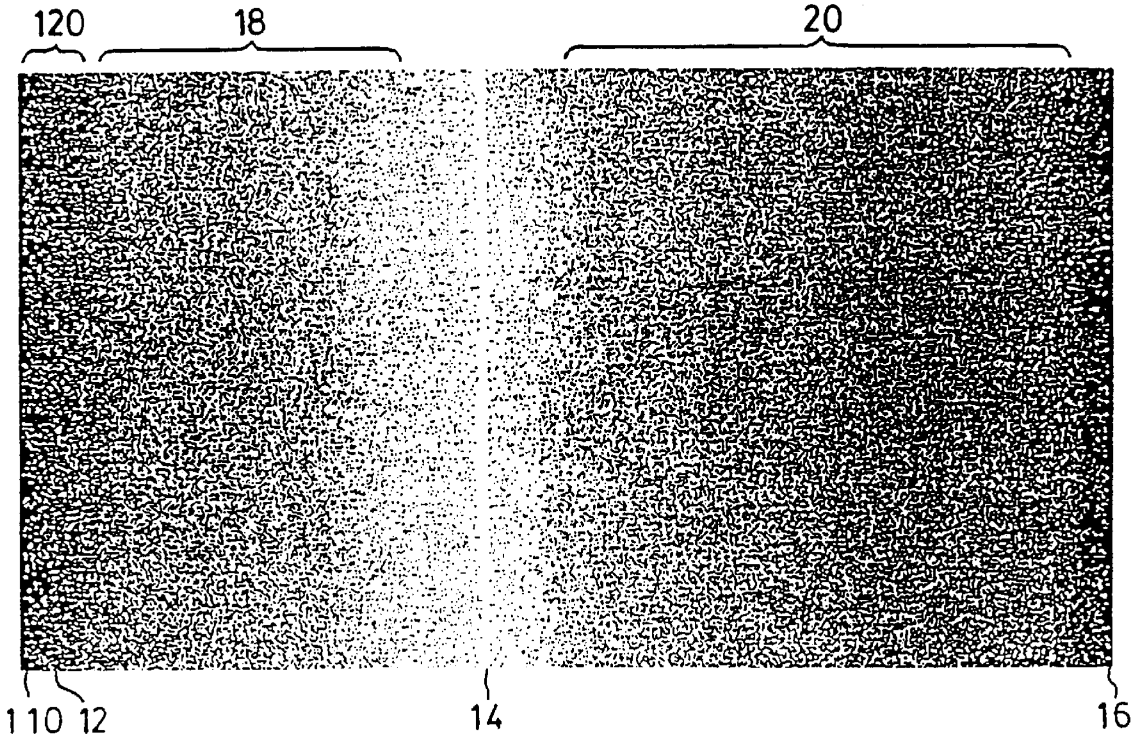
FIG. 4 is an enlarged view of a portion of FIG. 3.

FIGS. 3 and 4 show the gradual change in conductive particle distribution in each of the interface zones 18, 20 and 120. The conductive particles are shown in black, consequently, higher concentrations of black dots represent volumes of higher conductivity, while areas devoid of black represent substantially insulative volumes. In FIG. 3, a ceramic heater, formed according to the second embodiment of the present invention, is shown in cross-section along its longitudinal axis. In FIG. 4, a portion of FIG. 3 is enlarged to show greater detail, from the shielding volume 110 at the leftmost edge to the conductive central volume 16 at the rightmost edge.

Figure 5:
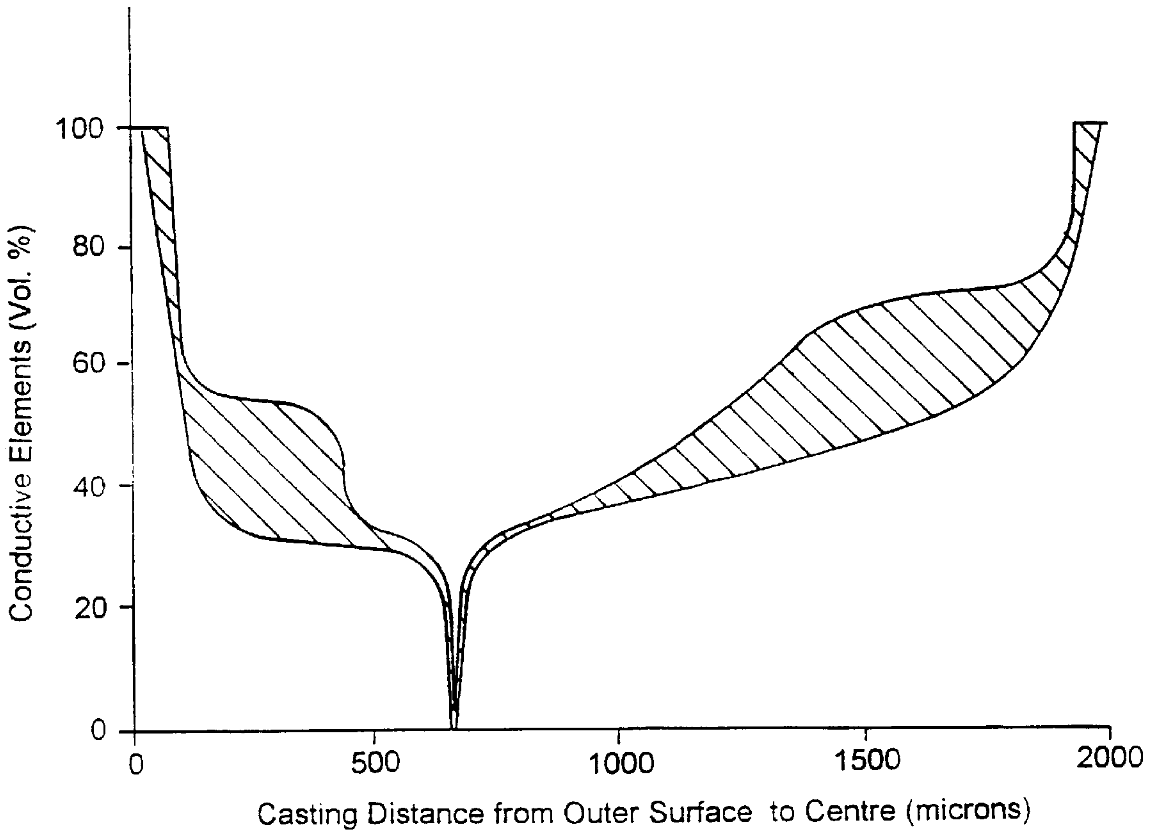
FIG. 5 is a graph illustrating the range of distribution of conductive elements in relation to casting distance in accordance with the present invention.

In FIG. 5, a graphical representation of a presently preferred range of distribution of conductive particles, from the outer surface of the ceramic heater body to its center, is shown as a volume percent of conductive elements in relation to distance, in microns. A preferred range of conductive particle density in the outer volume is shown at 212, followed by a gradual decrease in conductive particles 218 to approximately zero at insulative region 214. A generally increasing range of conductive elements 220, corresponding to the second interface zone, extends from insulative region 214 to a range 216 for the inner volume.

As will be apparent to those skilled in the art, the ranges shown in FIG. 5 are examples of optimum values only. Concentrations falling outside these optimum ranges can still result in a ceramic heater body having a high resistance to thermal shock and improved thermal cycling characteristics, as is encompassed by the present invention as defined in the claims.

Figure 6:
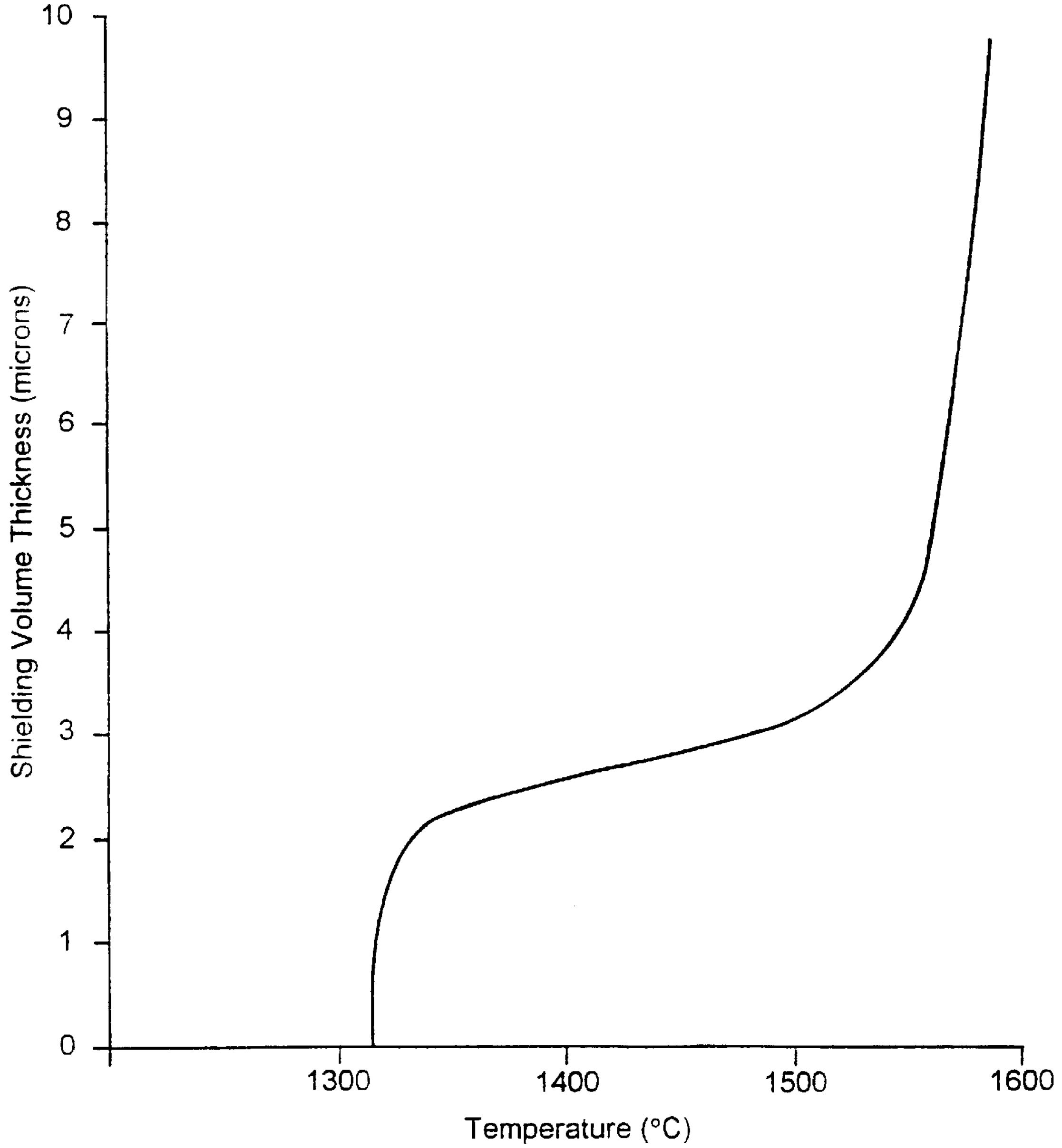
FIG. 6 is a graph illustrating a relationship between the thickness of an outer shielding volume in relation to maximum operating temperature for a ceramic heater in accordance with the present invention.

FIG. 6 shows a graphical representation of the shielding volume thickness, in microns, in relation to peak operating temperature under repeated thermal cycling. Ceramic heaters having shielding volume thicknesses of about 1, 2, 3, 4, 6, 8, and 10 microns were cycled fifty times to a maximum operating temperature and held at this temperature for about 100 seconds at each cycle. As used herein, maximum operating temperature means the highest temperature before which softening, or failure, of the ceramic occurred. Temperatures were measured with an optical pyrometer. After the repeated cycling, no appreciable surface defects, porosity or weight change were observed. As is shown, the maximum operating temperature for outer volume thicknesses of about 5 microns to about 10 microns is approximately 1580° C., and may be appreciably higher for greater thicknesses.

An advantage of the ceramic heater of the present invention is that the inner, resistive volume is shielded from oxidization. When the heater is employed as a glow plug in a diesel engine, the outer volume, or alternatively, the shielding volume, alone comes into contact with oxidizing gases. The composition of the outer, or optional shielding, volume is highly resistant to oxidation and corrosion, thereby greatly extending the life of the ceramic heater in comparison to prior art ceramic heaters.

A further advantage of the ceramic heater of the present invention is that internal stresses are minimized by the elimination of distinct interfacial junctions between the resistive, insulative and conductive volumes. The graduated transition from one volume to another, provided by the graduated composition at the interface zones, allows the ceramic heater to undergo repeated thermal cycling without failure or cracking caused by thermal stress.

Although the disclosure describes and illustrates the preferred embodiments of the invention, it is understood that the invention is not limited to these particular embodiments. Many variations and modifications will now occur to those skilled in the art. For definition of the invention, reference is made to the appended claims.

We claim:

1. A method for making a ceramic heater element having reduced internal stress, comprising the steps of:

providing a first electrically conductive mixture and a second substantially non-conductive mixture, each said mixtures comprising a liquid phase having particles suspended therein, passing said first and second mixtures through a slip casting mold while varying proportions of said first and second mixtures to form a unitary green ceramic casting having an outer volume substantially consisting of said first mixture, a first interface zone having a graduated composition varying inwardly from said outer volume to an intermediate volume substantially consisting of said second mixture, and a second interface zone having a graduated composition varying inwardly from said intermediate volume to an inner volume consisting of both said first and second mixtures, said interface zones permitting repeated thermal cycling of the heater element without failure due to internal thermal stress;

reforming an end of said green ceramic casting for electrically connecting said outer volume and said inner volume;

separating said casting from said mold; and sintering said casting.

2. A method according to claim 1 wherein said first mixture includes suspended particulate having a composition containing 40–100 vol. % electrically conductive ceramic component, 0–60 vol. % electrically non-conductive ceramic component, and 0–6 vol % sintering aid component.

3. A method according to claim 2 wherein said electrically conductive ceramic component is selected from the group consisting of $MoSi_2$, TiN, ZrN, TiCN and $TiB_2$, said electrically non-conductive component is selected from the group consisting of $Si_3N_4$, silicon carbide, aluminum nitride, alumina, silica, and zirconia, and said sintering aid component is selected from the group consisting of Y, Mg, Ca, Hf, and the Lanthanide group of elements.

4. A method according to according to claim 1 wherein said second mixture has suspended particulate having a composition containing 95–100 vol. % electrically non-conductive ceramic component, and 0–5 vol % sintering aid component.

5. A method according to claim 4 wherein said electrically non-conductive ceramic component is selected from the group consisting of $Si_3N_4$, silicon carbide, aluminum nitride, alumina, silica, and zirconia, and said sintering aid component is selected from the group consisting of Y, Mg, Ca, Hf, and the Lanthanide group of elements.

6. A method according to claim 1 wherein said liquid phase is water.

7. A method according to claim 1 wherein said step of reforming is ultrasonic reforming.

* * * * *